United States Patent
Gordon

(10) Patent No.: US 6,385,771 B1
(45) Date of Patent: May 7, 2002

(54) GENERATING CONSTANT TIMECAST INFORMATION SUB-STREAMS USING VARIABLE TIMECAST INFORMATION STREAMS

(75) Inventor: Donald F. Gordon, Los Altos, CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/290,618

(22) Filed: Apr. 13, 1999

Related U.S. Application Data

(63) Continuation-in-part of application No. 09/067,427, filed on Apr. 27, 1998.

(51) Int. Cl.[7] .............................. H04N 7/12; H04N 5/91
(52) U.S. Cl. ....................... 725/90; 375/240.12; 386/68
(58) Field of Search ..................... 386/688; 725/88–90, 725/20, 102, 131–134, 139–142, 151–153; 375/240.12, 240.13

(56) References Cited

U.S. PATENT DOCUMENTS

| | | | | |
|---|---|---|---|---|
| 4,939,587 A | * | 7/1990 | Deslypper ................... | 358/342 |
| 5,530,477 A | * | 6/1996 | Coelho ....................... | 348/390 |
| 5,606,359 A | | 2/1997 | Youden et al. ................ | 348/7 |
| 5,717,816 A | * | 2/1998 | Boyce et al. ................ | 386/111 |
| 5,729,648 A | * | 3/1998 | Boyce ......................... | 386/68 |
| 5,740,307 A | | 4/1998 | Lane ........................... | 386/68 |
| 5,742,347 A | | 4/1998 | Kandlur et al. .............. | 348/426 |
| 5,757,967 A | * | 5/1998 | Gonzales ..................... | 382/233 |
| 5,859,660 A | | 1/1999 | Perkins et al. ................ | 348/9 |
| 5,861,881 A | | 1/1999 | Freeman et al. ............. | 345/302 |
| 5,881,202 A | * | 3/1999 | Herz ........................... | 386/68 |
| 5,917,830 A | | 6/1999 | Chen et al. .................. | 370/487 |
| 6,005,561 A | | 12/1999 | Hawkins et al. ............. | 345/327 |
| 6,057,832 A | | 5/2000 | Lev et al. ..................... | 345/327 |
| 6,167,088 A | * | 12/2000 | Sethuraman ............. | 375/240.1 |

OTHER PUBLICATIONS

Section 13.2.2.5 "VCR–like Functions", Digital Video: An Introduction to MPEG–2, B. G. Haskell et al., p. 302.

* cited by examiner

Primary Examiner—Andrew Faile
Assistant Examiner—Reuben M Brown
(74) Attorney, Agent, or Firm—Moser, Patterson & Sheridan LLP

(57) ABSTRACT

A method and apparatus for processing an information stream comprising a plurality of compressed information frames having an associated original or source timecast parameter to produce an information sub-stream having a substantially constant timecast parameter. The invention generates an information substream having a timecast parameter that is held substantially constant, even though the timecast parameter of the input stream may vary.

20 Claims, 6 Drawing Sheets

GENERATING CONSTANT TIMECAST INFORMATION SUB-STREAMS USING VARIABLE TIMECAST INFORMATION STREAMS

This application is a continuation in part of U.S. patent application Ser. No. 09/067,427, filed on Apr. 27, 1998 for METHOD FOR GENERATING INFORMATION SUB-STREAMS FOR FF/REW APPLICATIONS, which is herein incorporated by reference in its entirety.

The invention relates to information distribution systems and, more particularly, the invention relates to a method of generating information sub-streams for use in information distribution systems.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Information distribution systems utilizing information streams conforming to the above standards or subsets of the above standards are known. For example, an interactive digital video on demand (VOD) service known as the OnSet™ system is manufactured by DIVA Systems Corporation of Menlo Park, Calif. The OnSet™ system distributes audio-visual information to individual subscribers utilizing MPEG-like information streams. The OnSet™ system also allows subscribers to interactively control the delivery of audio-visual information using consumer-friendly commands, such as fast-forward (FF), rewind (REW), pause (PAUSE), play (PLAY) and the like.

The OnSet™ system utilizes additional information streams to provide FF and REW functionality to subscribers. Specifically, the OnSet™ system utilizes a main information stream to carry a desired audio-visual program. Additionally, the OnSet™ system utilizes first and second information sub-streams for carrying respective FF and REW versions of at least the video portion of the desired audio-visual program. The FF and REW streams associated with an audio-visual program are accessible to a subscriber along with the audio-visual program. By activating a FF or REW mode of operation, the subscriber's set top terminal will begin decoding, respectively, the FF or REW stream. In this manner, the OnSet™ system provides FF and REW control features to a subscriber.

One technique for providing FF or REW capability to a subscriber is to simply increase the bandwidth allocation of a channel providing a program to the subscriber. This technique disadvantageously increases the cost of delivering the program to the subscriber by inefficiently using the available bandwidth and by forcing the subscriber's equipment to perform a FF or REW frame selection process. Thus, to reduce subscriber-side processing requirements, it is desirable to process program material at the server side to generate frame-reduced (i.e., temporally decimated) information streams suitable for use as FF or REW streams.

A typical technique for generating FF and REW streams comprises decoding an MPEG or MPEG-like video information stream to produce an uncompressed, baseband format video signal, such as a composite or component video signal. The baseband format video signal is then coupled to a frame or field counter which identifies every Nth video frame (or pair of fields) by, e.g., counting the number of horizontal or vertical synchronization pulses in the signal. Each Nth video frame (or pair of fields) is then encoded in an MPEG-like manner and stored on a video server for subsequent delivery to a subscriber. Unfortunately, this technique for generating FF and REW streams is very slow and computationally intensive.

A real-time FF display technique comprises decoding, at a subscriber's decoder, only non-predicted video frames (i.e., only intra-frame encoded video frames) within a main video information stream. That is, the decoder processes an MPEG or MPEG-like video information stream by ignoring all forward-predictive coded video frames (i.e., P-frames) and bi-directionally-predictive coded video frames (i.e., B-frames). The resulting decoded video stream will comprise only those video frames associated with intra-coded video frames (i.e., I-frames). Thus, in the case of an MPEG or MPEG-like video information stream having, e.g., a repeating 15 frame group of picture (GOP) format including one I-frame, the resulting processed video stream will include only one fifteenth of the video frames associated with the original, unprocessed MPEG or MPEG-like video information stream. Unfortunately, in the case of a variable GOP structure, or in the case of a GOP structure allowing for a large number of non-I-frame video frames, this processing technique provides unsatisfactory results. Specifically, in these two cases, this real-time subscriber-side processing technique provides a resulting processed stream containing too little video information or providing a "jerky" FF or REW display.

Therefore, a need exists in the art for a rapid and computationally efficient method for generating FF and REW streams in particular, and information sub-streams in general, that addresses the problems associated with the above-described techniques

SUMMARY OF THE INVENTION

The invention is a method and apparatus for processing an information stream comprising a plurality of compressed information frames having an associated original or source timecast parameter to produce an information sub-stream having a substantially constant timecast parameter. The invention generates an information substream having a timecast parameter that is held substantially constant, even though the timecast parameter of the input stream may vary.

In one embodiment of the invention, an input information stream having a variable frame rate (e.g., 24, 30 or 60 frame per second) and a normalized playback rate of one is used to generate a substream having a substantially fixed frame rate (e.g., 30 frames per second) and an apparent playback rate of nine times the normalized playback rate. The invention selects, extracts and assembles timeslices from the input information stream to generate an information substream. The timeslice selection and extraction steps are adapted in response to variations in one or more parameters (such as frame rate) of the input information stream.

In another embodiment of the invention, a method for producing an information sub-stream having a substantially constant timecast is suitable for use in, e.g., a system for processing an information stream having a timecast parameter susceptible to variations. The method includes the steps of deriving, in response to the information stream timecast and a desired information sub-stream timecast, a timeslice parameter; extracting, from the information stream according to the derived timeslice parameter, a plurality of information frames or information frame components, the extracted information frames on information frame components forming the information substream; and adapting, in response to changes in the information stream timecast, the timeslice parameter such that the information substream maintains a substantially constant timecast.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
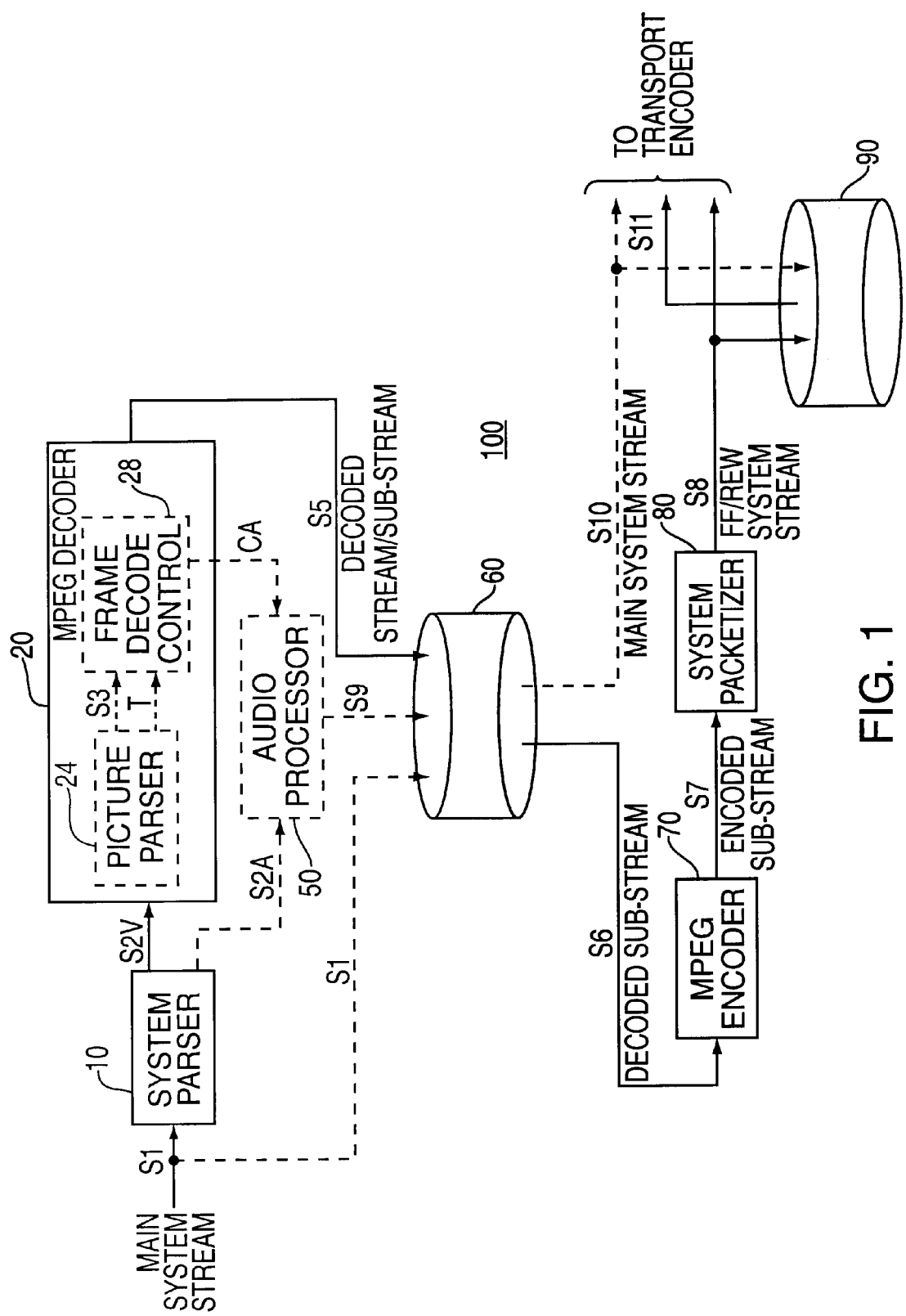
FIG. 1 shows a block diagram of an information stream processing system according to the invention.

FIG. 1 shows a block diagram of a information stream processing system 100 according to the invention. Specifically, the system 100 of FIG. 1 receives, e.g., an MPEG-like system stream S1 comprising, e.g., a plurality of program streams. An "MPEG-like" system stream is encoded using prediction-based encoding such as MPEG-1 or MPEG-2. A system parser 10 parses the MPEG-like system stream S1 to identify a desired program stream. The desired program stream (e.g., a movie, television show or any other audio-visual presentation) comprises a compressed video information stream S2V having an associated compressed audio information stream S2A. The compressed video information stream S2V is coupled to a picture processor 20, illustratively an MPEG decoder. The associated compressed audio information stream S2A is optionally coupled to an audio processor 50.

MPEG decoder 20 decodes the compressed video information stream S2V to produce an uncompressed (i.e., decoded) digital video stream S5, illustratively a source intermediate format (SIF) digital video stream. In a normal mode of operation, the MPEG decoder 20 produces a full-length; uncompressed digital video stream S5 comprising substantially all of the video information included within the compressed video information stream S2V. In either of a fast-forward mode of operation and a rewind mode of operation, the MPEG decoder 20 produces a uncompressed digital video stream S5 comprising a subset of the video information included within the compressed video information stream S2V. The subset may comprise, e.g., every Nth frame of video included within the compressed video information stream S2V. In one embodiment of the invention N is equal to nine. Thus, depending on its mode of operation, the MPEG decoder 20 produces an uncompressed digital video stream or sub-stream S5 comprising, respectively, substantially all or a subset of the video information included within the compressed video information stream S2V.

An uncompressed digital video sub-stream S5 as described above comprises a fast-forward (FF) video stream. Similarly, a FF video stream, when displayed in a temporally reversed manner, comprises a fast-reverse or rewind (REW) video stream. Thus, since the digital video sub-stream S5 comprises only a sub-sample (e.g., every Nth frame) of the original video stream, the digital video sub-stream S5 will produce a FF (or REW) display of the underlying video information when displayed on a display device. The generation of FF and REW streams from the information in the digital sub-stream S5 will be discussed in more detail below with respect to FIGS. 2 and 3.

The uncompressed digital video stream or sub-stream S5 is coupled to a memory unit 60, illustratively a mass storage unit such as a hard disk array or other sufficiently large memory device(s), that stores the uncompressed digital video stream S5. In the exemplary information stream processing system 100 of FIG. 1, memory unit 60 is used to store a normal video stream, a fast forward video sub-stream and a rewind video sub-stream associated with a particular compressed video information stream S2V. The uncompressed digital video stream S5 used to provide a normal stream may be stored in a sequential manner in memory unit 60. Similarly, the uncompressed digital video sub-stream S5 used to provide a fast-forward stream may be stored in a sequential manner in memory unit 60. Finally, the uncompressed digital video sub-stream S5 used to provide a rewind stream may be stored in a reverse sequential manner in memory unit 60.

It must be noted that, before compression, the fast-forward and rewind video sub-streams comprise essentially the same video information, though temporally mirrored. As such, a single sub-stream may be used to provide both FF and REW sub-streams by storing a single sub-stream in, respectively, both forward and reverse frame order on memory unit 60. This may be accomplished by allocating two areas of memory within memory unit 60 to, respectively, FF and REW sub-streams. As the uncompressed digital video sub-stream S5 is received by the memory unit 60, the sub-stream S5 is stored twice on a frame by frame basis.

That is, the sub-stream is stored in a forward temporal frame order in the FF memory allocation and in a reverse temporal frame order in the REW memory allocation.

In situations where memory unit 60 is relatively small, the single sub-stream may be stored once in a manner that delineates video frame boundaries. By accessing the stored sub-stream in a forward or reverse temporal manner, respective FF or REW information streams are produced at the output of memory unit 60.

To provide a fast-forward stream or fast-rewind sub-stream for use in a compressed information delivery system, the uncompressed sub-stream stored in memory unit 60 is retrieved and coupled to an MPEG encoder 70 as information stream S6. The MPEG encoder 70 operates in a standard manner to generate an MPEG-like information sub-stream S7. A system packetizer 80 packetizes the MPEG-like information sub-stream S7 to produce a system stream S8 for subsequent transport encoding and delivery to a subscriber via a transport encoder and communications channel (not shown).

The production of FF and REW sub-streams will be discussed in more detail below with respect to FIGS. 2 and 3. Briefly, to produce a FF sub-stream, the uncompressed sub-stream stored in memory unit 60 is retrieved in a normal (i.e., forward) temporal order and encoded by MPEG encoder 70. To produce a REW sub-stream, the uncompressed sub-stream stored in memory unit 60 is retrieved in a reverse temporal order and encoded by MPEG encoder 70. In situations where memory unit 60 is relatively small, only one sub-stream is stored.

As previously noted, the OnSet™ system provides subscribers with three information streams for a particular audio-visual programs: a main information stream carrying a "normal play" (i.e., non-decimated) audio-visual program, and associated FF and REW streams. A subscriber may switch between the main information stream and the FF (or REW) stream to achieve a FF (or REW) effect. The main, FF and REW streams are typically stored on the same video "server" (e.g., memory unit 60 or mass storage unit 90) and are differentiated by, e.g., respective packet identifiers (PID). It is important to note that the main system stream S1 depicted in FIG. 1 may comprise any type of information stream suitable for carrying video information.

The inventors have determined that a conventional (i.e., analog) video cassette recorder (VCR) operating in a fast-forward mode produces an image having an effective frame rate of between, approximately, six and twenty times the normal (i.e., play-mode) frame rate. Thus, to mimic the visual effect of a conventional VCR fast-forward mode of operation the picture processing unit 20 typically uses a value of N equal to, illustratively, nine. The value of N can obviously be modified to vary the effective frame rate to any rate desirable.

Figure 2:
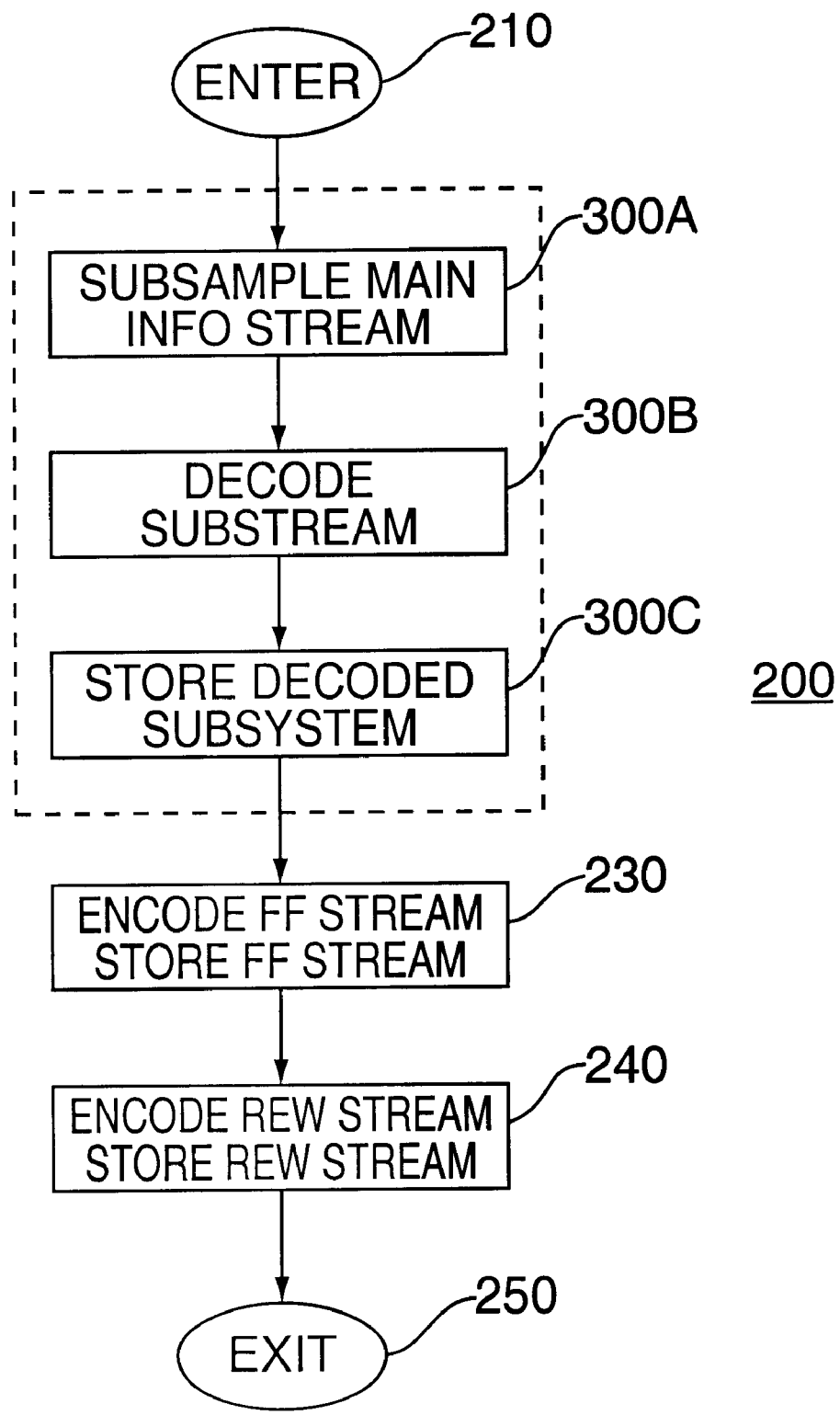
FIG. 2 shows a flow diagram of a process for generating information sub-streams according to the invention and suitable for use in the information stream processing system of FIG. 1.

FIG. 2 shows a flow diagram of a process 200 for generating compressed information sub-streams according to the invention. The generating process 200 is entered at step 210, when a compressed information stream, illustratively compressed video information stream S2V, is received by, illustratively, picture processing unit 20 of the information stream processing system 100 of FIG. 1. The generating process 200 proceeds to step 300A, where the compressed information stream is subsampled or decimated on a frame by frame basis to produce a compressed information sub-stream. The generating process 200 then proceeds to step 300B;, where the compressed information sub-stream is decoded to produce an uncompressed information sub-stream, illustratively decoded sub-stream S5. The generating process 200 then proceeds to step 300C, where the decoded sub-stream is stored in, illustratively, memory unit 60. It will be recognized by those skilled in the art that step 300C may be incorporated into step 300 such that the uncompressed information sub-stream is stored in, e.g., memory unit 60 on a frame by frame basis (i.e., store each uncompressed frame as it is decoded). An exemplary method for implementing steps 300A–300C, which together form step 300, will be discussed below with respect to FIG. 3.

After storing the decoded (i.e., uncompressed) information sub-stream (step 300C), the generating process 200 proceeds to step 230. At step 230, the stored uncompressed sub-stream is retrieved in a normal (i.e., forward) temporal frame order from memory as, illustratively, decoded sub-stream S6 and encoded by, illustratively, MPEG encoder 70 to form an encoded fast-forward (FF) sub-stream. The encoded FF sub-stream is then stored in, illustratively, mass storage unit 90.

After storing the encoded FF sub-stream (step 230), the generating process 200 proceeds to step 240. At step 240, the stored uncompressed sub-stream is retrieved in a reverse temporal frame order from memory as, illustratively, decoded sub-stream S6 and encoded by, illustratively, MPEG encoder 70 to form an encoded fast-rewind (REW) sub-stream. The encoded REW sub-stream is then stored in, illustratively, mass storage unit 90. The generating process 200 is exited at step 250.

The above-described sub-stream generating process is utilized to produce MPEG (or MPEG-like) FF and REW sub-streams. These sub-streams are shown as being stored in mass storage unit 90. In the exemplary information stream processing system 100 of FIG. 1, two storage units (60 and 90) are shown. The first memory unit 60 is used primarily as temporary storage for stream S5, the uncompressed stream or sub-stream produced by picture processor 20. The second mass storage unit 90 is used primarily for storage of the (compressed) FF and REW system stream S8. It should be noted that a single mass storage unit may be used to perform all these functions. Moreover, it should be noted that the main system stream (S1 and S10) may be stored on either or both of the two storage units. Finally, the storage units (60 and 90) may produce respective output streams (S10 and S11) that are coupled to the transport encoder (not shown).

Figure 3:
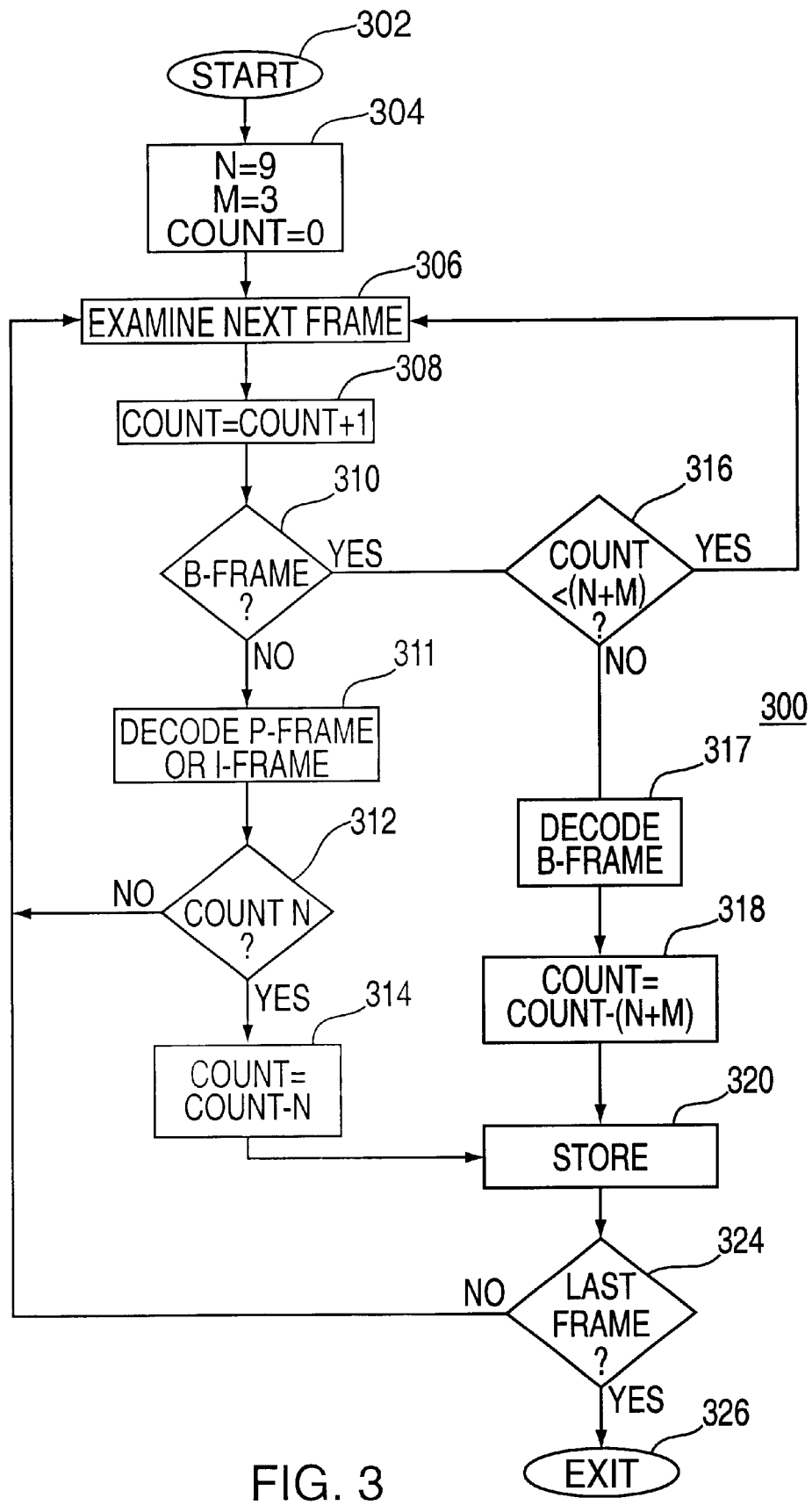
FIG. 3 shows a flow diagram of an information frame selection and decode method according to the invention and suitable for use in the information sub-stream generating process of FIG. 2 and the information stream processing system of FIG. 1.

FIG. 3 shows a flow diagram 300 of an information frame selection and decode method according to the invention and suitable for use in the information stream processing method 200 of FIG. 2, and the information stream processing system FIG. 1. Specifically, the frame selection and decode method 300 is an information frame selection and decode method suitable for use in picture processing unit 20. The frame selection and decode method 300 is intended to couple approximately every Nth information frame within the MPEG-like system stream S1 to MPEG decoder 20.

The frame selection and decode method 300 is entered at step 302 when picture processor 20 receives, e.g., an initial sequence header indicative of a video frame. At step 304, several variables are initialized. Specifically, a variable N representing a frame "keep rate" is initialized to 9 (i.e., keep every 9th frame); a variable M representing a "keep window" is initialized to 3 (i.e., keep one frame within a three frame window centered on the Nth frame); and a counter variable COUNT is initialized to 0. The keep window M is used to provide a boundary to the keep rate N, thereby reducing jerkiness in the resulting FF/REW information stream. The keep rate N and the keep window M may, of course, be variable or predetermined. The keep rate N and the keep window M may by dynamically adjusted by an operator (or algorithm) in response to a visual quality judgment (or measurement) of the resulting information sub-stream.

After initialization, the method 300 proceeds to step 306, where the picture header of the next frame in the compressed video information stream S2V is examined. The method then proceeds to step 308, where COUNTER is incremented, and to step 310, where a query is made as to whether or not the examined frame was a B-frame.

If the query at step 310 is answered negatively, i.e., the frame is an I-frame or a P-frame, then the method proceeds to step 311, where the I-frame or a P-frame is decoded. The method 300 then the method proceeds to step 312, where a query is made as to whether the count is greater than or equal to the keep rate variable N. If the query at step 312 is answered affirmatively, then the frame should be decoded. The method 300 then proceeds to step 314, where COUNTER is set equal to the present count value minus the decode rate value. If every ninth frame, in the exemplary embodiment, is an I-frame or P-frame, then step 314 will always set COUNTER back to zero. If, e.g., the Nth frame was a B-frame, then COUNTER may be greater than N. The method then proceeds to step 320.

If the query at step 310 is answered affirmatively, i.e., the frame is a B-frame, then the method 300 proceeds to step 316. At step 316, a query is made as to whether COUNTER is less than the keep rate N plus the keep window M. If the query at step 316 is answered affirmatively (i.e., within the allowable keep window), then the method proceeds to step 306, where the picture header of the next frame in the compressed video information stream S2V is examined. If the query at step 316 is answered negatively, then the method proceeds to step 317, where the B-frame is decoded with respect to two I-frames and/or P-frames previously decoded at step 311. The method 300 then proceeds to step 318, where COUNTER is decremented by the keep rate N plus the keep window M. The method then proceeds to step 320.

At step 320 the most recently decoded frame is stored and the method 300 proceeds to step 324, where a query is made as to whether the examined frame is the last frame of, e.g., a video sequence. If the query at step 324 is answered affirmatively, the method 300 exits at step 326. If the query at step 324 is answered negatively, then the method 300 then proceeds to step 306, where the picture header of the next frame in the compressed video information stream S2V is examined. The sequence of decoded frames forms the uncompressed digital video sub-stream S5.

In one embodiment of the invention, computational demands are reduced by decoding only those frames that are necessary to produce the FF/REW stream. That is, information frames are stored in a buffer until the counter COUNTER has incremented to a point that cannot possibly use the information of the buffered frame. For example, a buffer capable of storing an entire GOP in a system utilizing fixed GOP sizes may be flushed each time a new GOP is received. In this manner, if a non-predicted frame (i.e., an I-frame) is the appropriate frame to decode, only one frame is actually decoded. If a predicted frame (i.e., a P-frame or a B-frame) is the appropriate frame to decode, only those frames necessary to decode the predicted frame are actually decoded. In another embodiment of the invention, computational demands are reduced by decoding and storing only I-frames or P-frames in this manner, there is not need to decode the two reference frames associated with a B-frame to be decoded, nor is there a need to calculate both forward and backward motion vectors. However, However since it may be the case that a large number of B-frames are received by the picture processing unit 20, B-frames may occasionally need to be decoded to avoid excessive "jerkiness" in the resultant video information sub-stream S5. In the case of a B-frame being decoded, the reference frames used to predict the B-frame must also be decoded.

The need to decode B-frames may be reduced by initially encoding the MPEG-like system stream S1 in a manner that contemplates sub-stream generation. For example, a standard 12 frame group of pictures (GOP) structure used in the ATSC system, when repeated, has the following form (in frame type sequence):

"$I_1B_1B_1P_1B_1B_1P_1B_1B_1P_1B_1B_1I_2B_2B_2P_2B_2B_2P_2B_2B_2P_2B_2B_2I_3B_3 \ldots$"

If every ninth frame is decoded in the above stream, the decoded frame will always be an I-frame or a P-frame (assuming that the first I-frame, $I_1$, is decoded). As previously discussed, keeping every 9th frame results in a FF/REW stream having a frame rate similar to the effective frame rate of a FF or REW operation of a standard VCR. Alternatively, a fast-play mode of operation may be provided by keeping every third frame. In the above GOP structure, every third frame is either an I-frame or a P-frame (assuming that the first I-frame, $I_1$, is decoded). The system of FIG. 1 optionally includes an audio processor 50 that may be used to generate an audio information sub-stream S9. The audio processor 50 receives the compressed audio information stream S2A that is associated with the compressed video information stream S2V coupled to picture processing unit 20. The audio processor 50 also receives the audio processor control signal CA optionally generated by frame decode controller 28. The audio processor 50 utilizes the audio processor control signal CA to identify audio frames or samples associated with the video frames included within video information sub-stream S5. The identified audio frames or samples are coupled to memory unit 60 as optional audio information sub-stream S9. The audio information sub-stream S9 may be a compressed format information stream (e.g., a Dolby AC3 audio stream), such as the compressed audio information stream S2A. Alternatively, the audio information sub-stream S9 may comprise uncompressed audio information stream by decoding the compressed audio information stream S2A using an audio decoder (not shown).

It should be noted that all the elements shown in FIG. 1, with the exception of memory unit 60 and mass storage unit 90, may be implemented entirely or partially in software. This is because the process of generating the information sub-streams to be stored in memory unit 60 and/or and mass storage unit 90 does not necessarily need to be performed in real time. In addition, the computational load on a processor running such a software implementation is greatly reduced when compared to the computational load of prior art methods.

In one embodiment of the invention, MPEG decoder 20 includes a picture parser 24 that parses the compressed video information stream S2V to extract packet header information associated with each frame. In an MPEG-compliant system, the picture header of a video elementary stream includes information identifying the type of compression encoding used to produce a particular information frame (i.e., I-, P- or B-frames). The parsed information frame S3 and a frame-type identification signal T are coupled to a frame decode controller 28. The frame decode controller 28 ideally couples only every Nth frame (and any other frames necessary to decode the Nth frame) to subsequent portions (not shown) of MPEG decoder 20. Thus, compressed video information sub-stream S5 comprises a subsampled version of the original video information stream S2V. Additionally, frame decode controller 28 optionally generates an audio processor control signal CA indicative of a picture frame being coupled to MPEG decoder 40. In this embodiment, the MPEG decoder 20 is used to decode only those information frames necessary to produce, e.g., the fast forward or rewind sub-streams. Thus, the amount of processing is reduced by avoiding decoding of non-essential frames (i.e., those frames not used to produce the Nth frame).

In one embodiment of the invention, memory unit 60 and/or mass storage unit 90 are capable of storing a plurality of compressed and uncompressed video, audio and other information streams. That is, in an embodiment in which one or both of the storage units are present, the one or both storage units many be used to store, e.g., a main information stream and associated information sub-streams such as FF and REW information sub-streams. In the exemplary embodiment of FIG. 1, each uncompressed video information stream represents a high effective frame-rate version of an associated program stream. The associated program stream(s) may also be stored in memory unit 60 and/or mass storage unit 90 as either compressed or uncompressed information streams. The associated program streams are typically stored in a compressed digital format, such as MPEG-1 or MPEG-2. For example, the system of FIG. 1 shows an optional signal path (dotted line) coupling the MPEG-like system stream S1 directly to the memory unit 60 for storage. The stored MPEG-like system stream S1 may be retrieved and coupled to a transport encoder (not shown) as optional main system stream S10. Alternatively, the optional signal path (dotted line) coupling the MEG-like system stream S1 directly to the memory unit 60 may also be coupled to mass storage unit 90 via signal path S10.

An important embodiment of the invention will now be described with respect to variable rate input information streams. Specifically, in one embodiment of the invention, FF and/or REW streams are produced in response to a variable rate input information stream. That is, FF and/or REW streams having a relatively constant frame rate (e.g., 9 times the frame rate of a "normal video stream" may be generated from, e.g., information streams providing either a variable frame rate or a non-ideal frame rate.

For purposes of the following discussion, it is useful to define the terms "timecast" and "timeslice." A "timecast" is an implicit or explicit play-back rate of a series of frames or frame components, such as fields. Timecasting for film or NTSC video is typically given in frames per second, such as 24 frames per second or 39.97 frames per second respectively. Since frames are sometimes comprised of interlaced fields, playback rates may also be expressed in terms of fields per second. More generally, timecasting may be expressed in terms of frame components (such as frames, fields, slices, macroblocks, blocks, pixels, raster lines and the like) as a function of time.

A "timeslice" is a snapshot of an image. That is, a timeslice represents the image within, e.g., a video stream that would be displayed at a given point in time relative to the playback of the video stream (e.g., a film, video or multimedia sequence).

The invention selects, extracts and assembles timeslices of an input information stream having an associated timecast parameter to generate an information sub-stream having an associated timecast parameter. The invention responsively adapts the selection and/or extraction of timeslices to variations of the timecast parameter associated with the input information stream such that the timecast parameter of the generated information sub-stream is held essentially constant.

The variable rate embodiment of the invention processes a sequential series of film, video ox multimedia frames or fields designed to be displayed at a pre-specified fixed frame rate or a variable frame rate. For example, a television program recorded to videotape may be recorded at 30 frames per second and have a duration of 24 minutes. Thus, the total number of frames is calculated by multiplying 30 frames per second by 60 seconds per minute by 24 minutes, resulting in a video sequence having 43,200 frames. As previously discussed, it is sometimes desirable to produce FF and/or REW streams having a reduced frame rate. In the case of a reduction by a factor of nine, is desirable to reduce the 43,200 frame stream into a 4800 frame sub-stream by extracting, from the 43,200 stream, every ninth frame.

The inventive method and apparatus operate to identify a source frame rate (SFR) of a received information stream, illustratively a video information stream. The source frame rate may be explicitly indicated by, e.g., information within the received information stream. The source frame rate may be implicitly known by, e.g., a default value in the absence of included information or by examining the received information stream and identifying frame-rate indicative parameters within the stream, such as repeated field indicative of 3:2 pull-down processing used to convert 24 fps source material into 30 fps material.

Figure 4A:
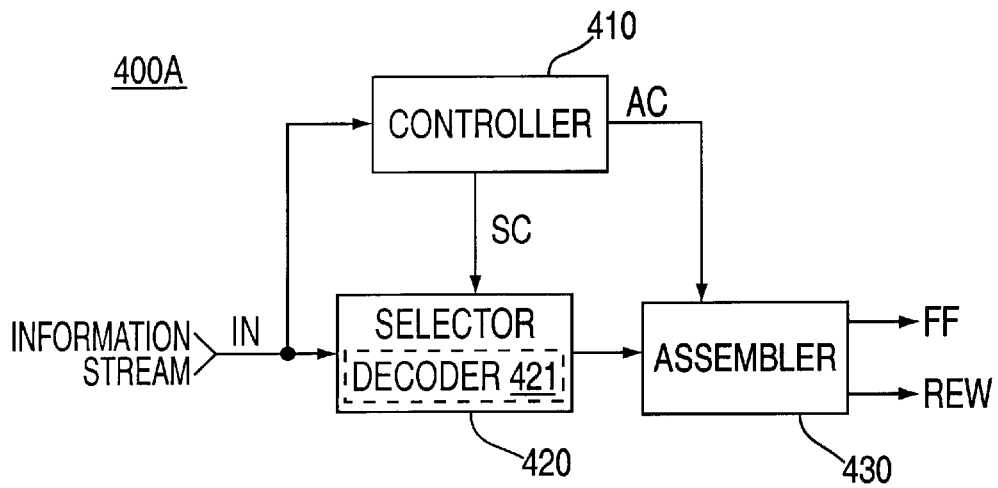
FIGS. 4A and 4B show respective block diagrams of alternate embodiments of an information stream processing system according to the invention.

FIG. 4A shows a block diagram of an alternate embodiment of an information stream processing system according to the invention. Specifically, the information stream processing system 400A of FIG. 4A comprises a controller 410, a selector 420 and an assembler 430. The information processing apparatus receives an input information stream IN, illustratively a video input information stream from a video source (not shown), and produces at least one of a fast forward (FF) and a rewind (REW) information stream. The FF and REW streams have substantially constant frame rates, while the frame rate of the input information stream IN may vary.

Referring now to FIG. 4A, controller 410 and selector 420 each receive the input information stream IN. Controller 410 determines what type of information stream IN has been received. Specifically, controller 410 identifies, in the case of a video information stream, at least a source frame rate (SFR) of the input video information stream IN. That is, the controller 410 identifies the timecasting associated with the input information stream IN. The controller 140 produces a selector control signal SC and an assembler control signal AC which are coupled to respectively selector 420 and assembler 430. The control signals are used to controllably extract and process timeslices of the input information stream IN to produce the FF and/or REW streams, as will be discussed with respect to the selector 420 and assembler 430.

Selector 420, in response to selector control signal SC, selects information (e.g., video) frames or frame components such as fields, slices, macroblocks, blocks, raster lines and the like at intervals based on their timecasting as determined by controller 410. That is, selector 420 selects the frame components based on timecasting so as to approximately equal a sub sample of every Nth timeslice. In this manner, selector 420 extracts from the input video stream IN only those portions of the video stream necessary to produce an output stream having a playback rate of 1/N times the original playback rate. The selected frames or frame components are coupled to assembler 430 for further processing.

Assembler 430 receives the selected frame or frame components and, in response to the assembler control signal AC produced by controller 410, produces a fast forward (FF) stream and, optionally, a rewind (REW) stream. The timeslices extracted from the input information stream IN by the selector 420 are assembled to produce respective information frames, such as video frames. The resulting assembled frame or frame components forms one of a FF sequence of frames and a REW sequence of frames. In the case of generating a FF sequence of frames, the assembled FF sequence of frames has been altered, in terms of the original timecasting, to produce a sequence of frames having a playback rate of 1/N times the original playback rate, and a temporal end to end "distance" of 1/N times the original temporal end to end "distance." The REW sequence of frames is similar to the FF sequence of frames, except that the REW sequence of frames has been inverted in terms of playback order (i.e., the temporal presentation order of the image frames has been inverted).

Selector 420 optionally includes a decoder 421. Decoder 421, in response to selector control signal SC indicating that the input video stream comprises the decoded video stream, decodes the input video stream to access the frame or frame components to be selected. Decoder 421 may be utilized to decode the entire input video stream or only those portions of the input video stream associated with the frame or frame components to be selected.

Figure 4B:
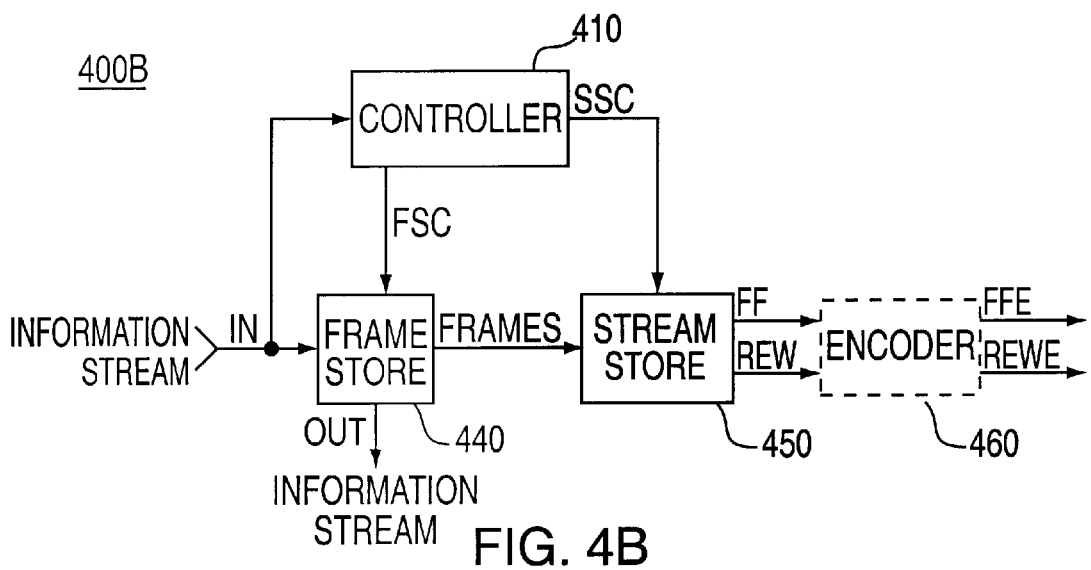

FIG. 4B shows a block diagram of an alternate embodiment of an information stream processing system according to the invention. Specifically, the information processing system 400B of FIG. 4B comprises a controller 410, a frame store 440, a stream store 450 and an encoder 460. The information processing apparatus 400B receives an input information stream in, illustratively a video input information stream from a video source (not shown), and produces at least one of a fast forward (FF) and a fast rewind (REW) information stream. The FF and REW streams have substantially constant frame rates, while the frame rate of the input information stream IN may vary.

Controller 410 and frame store 440 each receive the input information stream IN. Controller 410 determines what type of information IN has been received, as previously described with respect to FIG. 4A. The controller 410 produces a frame store control signal FSC and a stream store control signal SSC.,which are coupled to, respectively, frame store 440 and stream store 450. The control signals are used to controllably extract and process time slices of the input information stream IN to produce at least one of a FF and REW stream.

Frame store 440 comprises, illustratively, a frame store memory capable of holding at least a single information frame, illustratively a video frame, from the input information stream IN. The frame store 440 of FIG. 4B is depicted as having a first output OUT and a second output FRAMES. The first output OUT produces a frame delayed version of the input information stream IN. That is, the input information stream IN is received by the frame store 440, stored and then coupled directly to the first output OUT as a delayed information stream. The second output FRAMES produces, in response to the frame store control signal FSC, individual information frames, illustratively video frames, which are then coupled to the stream store 450. That is, information frames passing through the frame store 440 are periodically selected to be coupled to the frames output by the frame store control signal FSC. In this manner, the controller 410 selects particular time slices of the input information stream IN to be coupled to the stream store 450.

The stream store 450, illustratively a buffer, receives the selected information frames signal FRAMES from the frame store 440. The received frames are appended to frames presently stored within the stream store such that an information sub-stream having an appropriate timecast is constructed on a frame by frame basis 440. Thus, the stream store 450 operates to store a time cast stream produced by the time slicing operation of the controller 410 and frame store 440. Stream store 450, in response to the stream store control signal SSC, couples the stored time cast stream to one or both of a fast forward (FF) and rewind (REW) output to produce respective fast forward and rewind sub-streams. In the case of the fast forward sub-stream FE, the stream store 450 couples the received information frames to the fast forward output in the order they were received. In the case of the fast rewind sub-stream REW, the stream store 450 couples the stored information frames in the reverse order in which they were received.

Optional encoder 460 comprises, illustratively, an MPEG2 video encoder. The optional encoder 460 receives one or both of the fast forward FF and fast rewind REW information sub-streams and responsively produces one or both of a respective encoded fast forward information sub-stream FFE and an encoded fast rewind information sub-stream REWE. While not shown explicitly, the optional encoder 460 of FIG. 4B may be advantageously employed in other embodiments of the invention disclosed herein, such as the embodiment described above with respect to FIG. 4A.

Controller 410 operates to produce encoded (FFE, REWE) or unencoded (FF, REW) information sub-streams according to a predetermined time cast (e.g., thirty frames per second). The controller 410 identifies a time cast parameter of the input information stream IN and responsively adjusts the frame store control signal FSC and the stream store control signal SSC to produce the appropriate information sub-streams FF and REW at the predetermined time cast.

Figure 5:
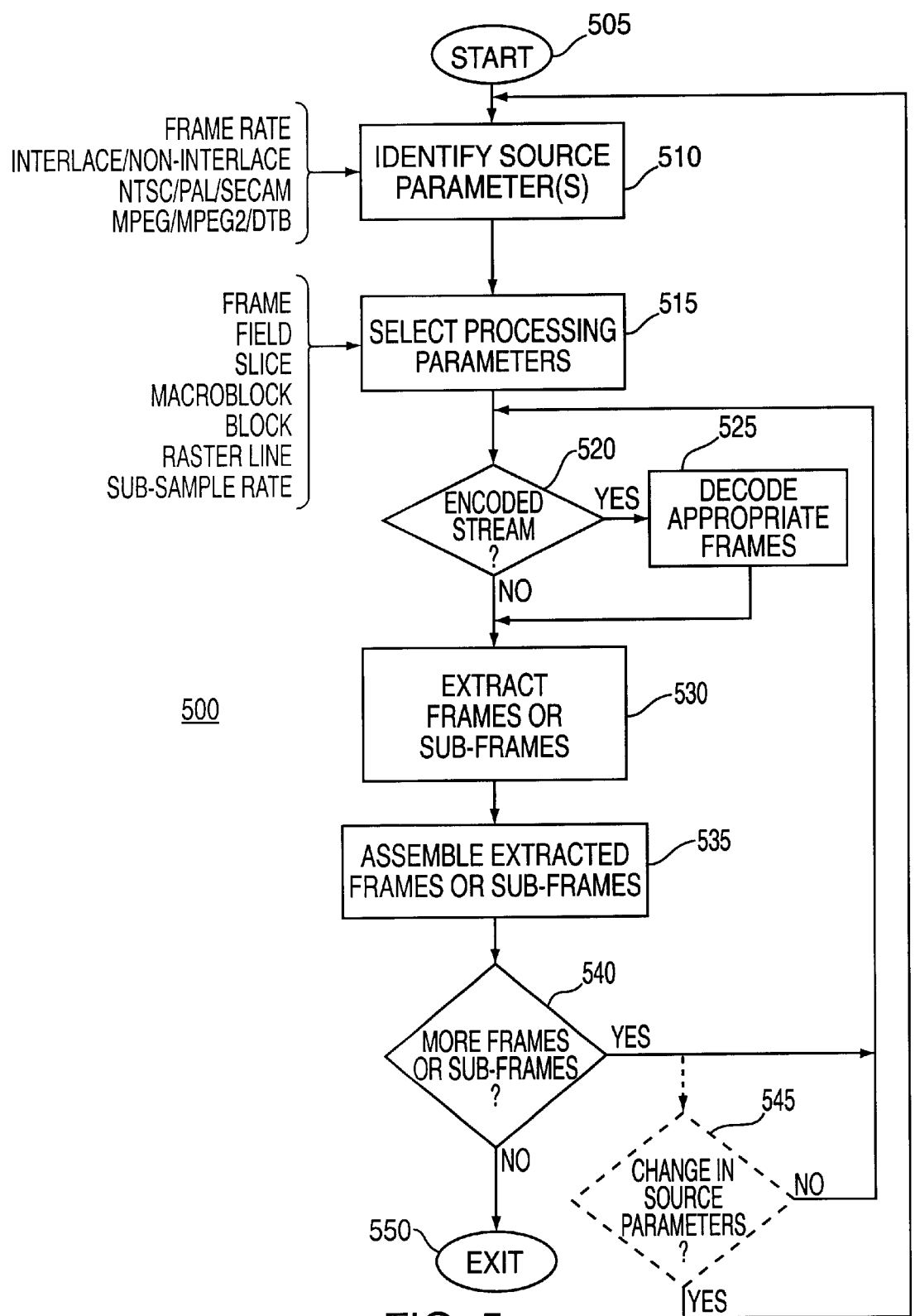
FIG. 5 shows a flow diagram of a process for generating information sub-streams according to the invention and suitable for use in the information stream processing systems of FIG. 1, FIG. 4A and FIG. 4B.

FIG. 5 shows a flow diagram of a process for generating information sub-streams according to the invention and suitable for use in the information stream processing systems of FIG. 1 and FIG. 4.

The method 500 of FIG. 5 is entered at step 505 and proceeds to step 510. At step 510 the source parameters of the video input stream IN are identified. That is, video parameters such as the frame rate, whether the stream is an interlaced or non-interlaced stream, the format of the stream (e.g., an NTSC, PAL, or SECAM analog stream or an MPEG-1, MPEG-2 or DTB digital stream), or, in the case of a digital video stream, whether the stream is e.g. an MPEG2 or MPEG1 video stream. The method 500 then proceeds to step 515.

At step 515 the processing parameters are selected. That is, the frame or frame components (field, slice, macroblock, block, raster line, sub-sample rate and the like) are selected for processing. In the case of an analog video stream, it may be appropriate to select and store information on a raster line basis. By contrast, in the case of a digital video stream it may be appropriate to select and process information on a slice or macroblock basis. The appropriateness of a particular component choice is related to the available memory and processing resources applied to the generation of information sub-streams. If memory is abundant, then frame or field level processing is appropriate. If memory is very limited, then slice or block level processing may be appropriate. The method 500 then proceeds to step 520.

At step 520 a query is made as to whether the input video stream is an encoded video stream. If the query at step 520 is answered negatively, then the method 500 proceeds to step 530. If the query at step 520 is answered affirmatively, then the method 500 proceeds to step 525, where the particular frames of frame components are decoded. The method 500 then proceeds to step 530.

At step 530 the frames or sub-frames of the input video stream necessary to produce at least a portion of the temporally compressed output video stream (i.e., the FF or REW stream) are extracted. That is, the information frame or frame components associated with one or more timeslices of the input information stream IN that are to be included within the FF and/or REW streams are extracted. For example, if the input information stream IN comprises 30 fps material, and it is desired to produce a FF stream at 30 fps having an apparent playback rate of nine times the input rate, then every ninth frame should be extracted. However, if the input information stream IN comprises 24 fps material, and it is desired to produce a FF stream at 30 fps having an apparent playback rate of nine times the input rate, then every $7.2^{nd}$ (approximately) frame should be extracted (9*24/30). The method 500 then proceeds to step 535. The method 500 then proceeds to step 535.

At step 525 the appropriate frames of the input video stream containing frame or sub-frame components are decoded. That is, at least the encoded information frames within the input information stream IN that include information to be extracted are decoded. In one embodiment of the invention, all the information frames are decoded. In another embodiment of the invention, only those information frames likely to include information to be extracted are included. To insure that the information to be extracted is decoded, one embodiment of the invention decodes each information frame likely to include such information, and one or more information frames surrounding (in display or transmission order) the information frame likely to include such information. Where an information frame to be decoded is a predicted information frame (i.e., a P-frame or B-frame), the reference frames used to predict the information frame to be decoded must also be decoded. The method 500 then proceeds to step 530.

After extracting the frames or sub-frames of the input video stream necessary to produce at least a portion of the temporally compressed output video stream (i.e., the FF or REW stream), the method 500 proceeds to step 535.

At step 535, that portion of the FF and/or REW stream associated with the frame(s) extracted at step 530 is assembled. That is, if the frame or frames extracted at step 530 comprise less than all of the frames necessary to produce the entire FF and/or REW stream, then those extracted frame(s) are assembled into a portion of the FF and/or REW stream. Additional portions are subsequently extracted and assembled until an entire FF and/or REW stream is formed. An entire FF or REW stream is formed by concatenating extracted frame or sub-frame components in a manner providing, e.g., a 1/N frame rate. The method 500 then proceeds to step 540.

At step 540 a query is made as to whether more frames or sub-frames of the input information stream IN are to be processed. If the query at step 520 is answered negatively, then the method 500 proceeds to step 550 where it is exited. If the query at step 540 is answered affirmatively, then the method 500 proceeds to step 520. Optionally, if the query at step 540 is answered affirmatively, then the method 500 proceeds to step 545.

At step 545 a query is made as to whether the source parameters of the input information stream IN have changed. That is, a query is made as to whether, e.g., the frame rate, format or other source parameters of, e.g., a video information within the input information stream IN have changed. If such parameters have changed, then the timeslice calculations and other calculations may require modification if, e.g., the frame rate of the FF and/or REW streams being formed (at step 535) are to be held substantially constant.

If the query at step 540 is answered negatively (i.e., no change in input information stream IN parameters), then the method 500 proceeds to step 520. If the query at step 540 is answered affirmatively, then the method 500 proceeds to step 510, where the change in parameters is fully considered, and the timeslice used to form the FF and REW streams is adapted as necessary.

In the case of an input information stream IN that will likely never change source parameters (e.g., a recorded movie or other information stream having known source characteristics), then step 545 may be avoided. Where a change in source parameters is possible, failure to adapt the timeslice decision to such a change may have undesirable effects on the resulting FF or REW streams. For example, in the case of the input information stream IN comprising 24 fps material, and a generated 30 fps FF stream having an apparent playback rate of nine times the input rate, then timeslice selected by the controller is such that every $7.2^{nd}$ (approximately) frame should be extracted. If the frame rate parameter of the input information stream IN becomes 30 fps, then the apparent playback rate of the FF stream will be reduced to approximately 7.2 times the input information stream IN. However, if the interlace parameter shifts from interlace mode to non-interlace mode (or vice verse), then the generated FF stream may become unintelligible, depending upon the processing parameters selected at step 515. For example, if slice level selection is used, the slices are lined up in a manner appropriate to the interlace mode used. If the interlace mode changes, then the slice alignment must also be changed to avoid improperly assembling an image frame.

Figure 6:
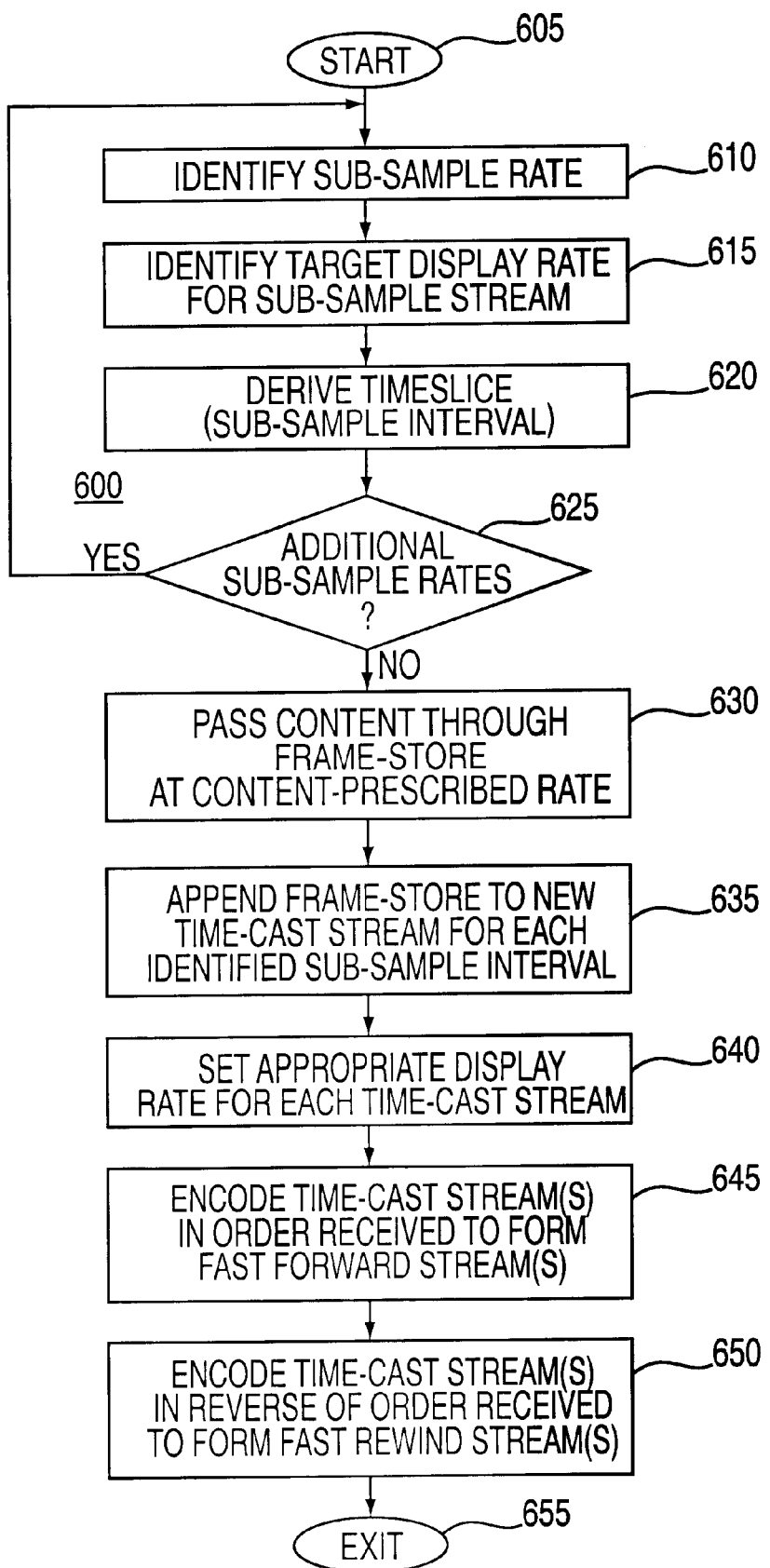
FIG. 6 depicts a flow diagram of a method of forming fast-forward and fast-rewind streams.

FIG. 6 depicts a flow diagram of a method of forming fast-forward and fast-rewind streams. Specifically, FIG. 6 depicts a flow diagram of a method of forming fast-forward and fast-rewind streams having predetermined sub-sampling rates. The method 600 of FIG. 6 is entered at step 605 and proceeds to step 610, where a sub-sample rate associated with a fast-forward or fast-rewind stream is identified. The sub-sampling rate is a rate of information frame sampling or retrieval applied to a source video stream to produce a sub-sampled video stream. For example, a sub-sample rate of $\frac{1}{6}$th, $\frac{1}{8}$th, $\frac{1}{20}$th and the like. The method 600 then proceeds to step 615.

At step 615 a target display rate is identified for the sub-sampled stream having a sub-sample rate identified at step 610. For example, the target display rate may be 30 frames per second, 60 fields per second and the like. The method 600 then proceeds to step 620.

At step 620 a time slice is derived for the sub-sampled fast-forward or fast-rewind stream. That is, a sub-sample interval is determined for the fast-forward or fast-rewind stream based upon the target display rate and identified sub-sampled rate. For example, if the identified sub-sampling rate at step 610 is determined to be $\frac{1}{6}$th, then the identified target display rate at step 615 is determined to be 30 frames per second, then the time slice is equal to 30 fps times $\frac{1}{6}$ which equals five frames per second which is equivalent to a 200 millisecond sub-sample interval. The method 600 then proceeds to step 625.

At step 625 a query is made as to whether additional sub-sample rates are to be determined. That is, a query is made to determine whether additional fast-forward or fast-rewind streams are to be generated from the same content stream. If the query at step 625 is answered affirmatively, then the method 600 repeats steps 610 through 620 for the next sub-sample rate. If the query at step 625 is answered negatively, then the method 600 proceeds to step 630.

At step 630 the content stream is passed through a frame storage unit at the content stream prescribed bit rate. It must be noted that the source of the content stream can be any information source, such as a video source, a film source, MPEG information stream, motion JPEG, and the like. The method 600 then proceeds to step 635.

At step 635 the information frame presently within the frame store is appended to one or more new time-cast streams as appropriate, depending upon the identified sub-sample interval for the one or more new time-cast streams. That is, in the case of a time-cast stream having a sub-sample interval of 200 milliseconds, the frame within the frame store register at the end of each 200 millisecond time interval is appended to the time-cast stream, thereby forming, on a frame by frame basis, a time-cast stream having an appropriate sub-sampling rate with respect to the initial content stream. The method 600 then proceeds to step 640.

At step 640 an appropriate display rate is set for each time-cast stream. That is, the display rate for each time-cast stream is set equal to the designated display rate of a display device associated with the time-cast stream (e.g., a native display rate). The method 600 then proceeds to step 645. At step 645 fast forward streams associated with one or more of the time-cast streams are formed by encoding, in the order received, the frames comprising the respective time-cast streams. The method 600 then proceeds to step 650.

At step 650 fast rewind streams are formed for one or more of the time-cast streams by encoding, in reverse frame order, the time-cast streams. The method 600 then proceeds to step 655 where it is exited.

The above-described methods for producing an information sub-stream having a substantially constant timecast are suitable for use in, e.g., a system for processing an information stream having a timecast parameter susceptible to variations. The method of FIG. 6 includes the steps of deriving, in response to the information stream timecast and a desired information sub-stream timecast, a timeslice parameter; extracting, from the information stream according to the derived timeslice parameter, a plurality of information frames or information frame components, the extracted information frames or information frame components forming the information substream; and adapting, in response to changes in the information stream timecast, the timeslice parameter such that the information sub-stream maintains a substantially constant timecast.

It is important to note that while the invention has been described primarily in terms of hardware, the invention may be implemented using hardware, software or a combination of hardware and software. For example, the invention may be practiced using a computer capable of receiving, processing and storing information streams such as the streams described below with respect to the invention. Moreover, while the invention is described within the context of processing a video information stream (e.g., an MPEG-like stream) to produce a video information sub-stream (i.e., a fast-forward or fast-rewind video information stream), the invention may be practiced using other types of information streams and for other purposes. For example, information sub-streams generated according to the invention at multiple locations may be compared to verify or authenticate information streams transmitted between the multiple locations.

The above-described invention provides rapid, cost-effective generation of information sub-streams. In the context of the OnSet™ interactive digital video on demand (VOD) service, the invention is used to process a large amount of content, such as movies, sporting events and the like. By contemporaneously providing FF and REW streams along with an associated main information stream, the OnSet™ system allows a subscriber to rapidly switch between streams. While the invention is advantageously employed within the context of a video on demand system, such as the previously-described OnSet™ interactive digital video on demand (VOD) service, other information processing and distribution systems may benefit from the invention.

Although various embodiments which incorporate the teachings of the present invention have been shown and described in detail herein, those skilled in the art can readily devise many other varied embodiments that still incorporate these teachings.

What is claimed is:

1. Apparatus for processing an input video stream having a variable timecast to produce an output video stream having a predetermined timecast, comprising:

a selector, for selecting at least one of intra-coded, predictively-coded, and bi-directionally-coded video frames or video frame components from said input video stream in response to a timeslice indicative control signal;

an assembler, for assembling selected video frames or frame components to produce said output video stream; and a controller, for producing said timeslice indicative control signal in response to a ratio between said input video stream timecast and said predetermined timecast;

said controller adapting said timeslice indicative control signal in response to changes in said input video stream timecast.

2. The apparatus of claim 1, wherein said selector further comprises a decoder, for decoding an encoded input video stream to produce a decoded input video stream.

3. The apparatus of claim 1, wherein each of said extracted timeslices comprise one of a video frame and a video sub-frame, said video sub-frame comprising a plurality of fields, slices, macroblocks, blocks and a raster line.

4. The apparatus of claim 1, wherein said output video stream comprises at least one of a fast forward (FF) video stream and a fast rewind (REW) video stream, said FF and REW video streams having respective predetermined timecasts.

5. The apparatus of claim 1, wherein said predetermined timecast comprises a substantially fixed timecast having a value of between approximately six frames per second and approximately twenty frames per second.

6. The apparatus of claim 1, wherein:

said selector comprises a memory for storing at least one information: frame and said assembler comprises a memory for storing a plurality of information frames;

said selector, in response to said timeslice indicative control signal, communicating to said assembler a stored information frame; and said assembler appending said communicated information frame to a previously communicated information frame.

7. The apparatus of claim 1, further comprising:

an encoder, for encoding said output video stream to produce an encoded video stream, said encoded video stream comprising at least one of an encoded fast forward video stream and an encoded fast rewind video stream.

8. A method for processing an information stream to produce an information sub-stream, said method comprising the steps of:

extracting, from said information stream, a plurality of timeslices at intervals determined by a relationship between a timecast of said information stream and a desired timecast of said information sub-stream; and assembling said extracted timeslices to form said information sub-stream;

said timeslice intervals being modified in response to changes in said timecast of said information stream.

9. The method of claim 8, wherein each said extracted timeslices comprise one of a video frame and a video sub-frame, said video sub-frame comprising at least one of a plurality of field, slice, macroblock, block and raster line components.

10. In a system for processing an information stream having a timecast parameter susceptible to variations, a method for producing an information sub-stream having a substantially constant timecast comprising the steps of:

deriving, in response to said information stream timecast and a desired information sub-stream timecast, a timeslice parameter;

extracting, from said information stream according to said derived timeslice parameter, a plurality of information frames or information frame components, said extracted information frames or information frame components forming said information substream; and adapting, in response to changes in said information stream timecast, said timeslice parameter such that said information sub-stream maintains a substantially constant timecast.

11. The method of claim 10, wherein each information frame is said information stream is passed through a frame store memory, and said step of extracting comprises the step of retrieving, from said frame store memory, information frames at a rate determined by said timeslice parameter.

12. The method of claim 10, further comprising the steps of:

deriving, in response to said information stream timecast and a second desired information sub-stream timecast, a second timeslice parameter;

extracting, from said information stream according to said derived second timeslice parameter, a plurality of information frames or information frame components, said extracted information frames or information frame components forming a second information substream; and adapting, in response to changes in said information stream timecast, said second timeslice parameter such that said second information sub-stream maintains a substantially constant timecast.

13. The method of claim 10, wherein said information stream comprises a video information stream, and said information substream comprises at least one of a fast forward (FF) or fast rewind (REW) substream.

14. The method of claim 12, wherein said information stream comprises a video information stream, and said information substream comprises at least one of a fast forward (FF) or fast rewind (REW) substream.

15. The method of claim 10, wherein said information stream comprises an encoded information stream, and said step of extracting includes the step of decoding said encoded information stream to produce at least one of an information frame and an information frame component.

16. The method of claim 10, further comprising the step of encoding said information substream to produce an encoded information substream.

17. The method of claim 10, wherein said information stream comprises a sequence of compressed information frames, and said step of extracting comprises the steps of:

identifying an Nth compressed information frame in said sequence of compressed information frames, where N is an integer;

decoding said identified Nth compressed information frame to produce an uncompressed information frame; and repeating said steps of identifying and decoding until each of said Nth compressed information frames in said compressed information stream has been processed.

18. The method of claim 17, wherein said step of identifying further comprises the step of determining if said identified information frame is a non-predicted information frame or a predicted information frame; and in the case of said identified information frame being a predicted information frame of a first type:

examining each of up to M compressed information frames subsequent or prior to said identified information frame to identify a one compressed information frame that is not a predicted information frame of said first type, where M is an integer; and substituting, for decoding purposes, said identified one information frame for said identified information frame.

19. The method of claim 18, wherein said information stream comprises an MPEG-like information stream, and said first type of information frame comprises a bi-directionally predicted frame.

20. The method of claim 17, wherein said step of identifying further comprises the step of:

determining if said identified information frame is a bi-directionally predicted information frame or a predicted information frame; and in the case of said identified information frame being a bi-directionally predicted information frame of a first type:

examining each of up to M compressed information frames subsequent or prior to said identified information frame to identify a one compressed information frame that is not a bi-directionally predicted information frame of said first type, where M is an integer; and substituting, for decoding purposes, said identified one information frame for said identified information frame.

* * * * *

UNITED STATES PATENT AND TRADEMARK OFFICE
CERTIFICATE OF CORRECTION

PATENT NO. : 6,385,771 B1
DATED : May 7, 2002
INVENTOR(S) : Gordon

It is certified that error appears in the above-identified patent and that said Letters Patent is hereby corrected as shown below:

Column 2,
Line 55, after "techniques" add a -- . --.

Column 3,
Line 20, change "on" to -- or --.

Column 8,
Line 3, delete "However,".

Column 9,
Line 20, change "many" to -- may --.
Line 36, change "MEG-like" to -- MPEG-like --.
Line 45, after "stream"" insert a -- ) --.

Column 10,
Line 8, change "ox" to -- or --.

Column 11,
Line 48, change "SSC.," to -- SSC, --.

Column 12,
Line 16, change "FE" to -- FF --.

Column 17,
Line 23, after "parameter" insert -- based on a ratio between the information stream timecast and the desired information sub-stream timecast --.

Signed and Sealed this

Sixteenth Day of August, 2005

JON W. DUDAS
*Director of the United States Patent and Trademark Office*